United States Patent
Moon et al.

(10) Patent No.: US 8,405,340 B2
(45) Date of Patent: Mar. 26, 2013

(54) ROBOT ARM AND METHOD OF CONTROLLING THE SAME

(75) Inventors: Kyung Won Moon, Seoul (KR); Kyung Shik Roh, Seongnam-si (KR); Jong Do Choi, Suwon-si (KR); Hyun Kyu Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 12/588,691

(22) Filed: Oct. 23, 2009

(65) Prior Publication Data

US 2010/0141197 A1 Jun. 10, 2010

(30) Foreign Application Priority Data

Dec. 5, 2008 (KR) .................. 10-2008-0123182

(51) Int. Cl.
*G05B 9/02* (2006.01)
(52) U.S. Cl. .................. 318/566; 318/560; 318/563
(58) Field of Classification Search .................. 318/560, 318/563, 566
See application file for complete search history.

(56) References Cited

U.S. PATENT DOCUMENTS 5,834,916 A * 11/1998 Shimogama et al. .... 318/568.13
5,994,864 A * 11/1999 Inoue et al. ................ 318/568.2
6,208,105 B1 * 3/2001 Kato et al. ................ 318/568.24
2002/0186299 A1 * 12/2002 Cofer ............................ 348/152
2004/0164960 A1 * 8/2004 Jacobus et al. ................ 345/161
2006/0058919 A1 * 3/2006 Sommer ...................... 700/245
2006/0061316 A1 * 3/2006 Aihara et al. ............. 318/568.12
2007/0244609 A1 * 10/2007 Kinoshita et al. .............. 701/22
2007/0270685 A1 * 11/2007 Kang et al. .................... 600/424
2008/0010706 A1 * 1/2008 Moses et al. ...................... 901/8
2009/0200978 A1 * 8/2009 Kato et al. .................... 318/566

FOREIGN PATENT DOCUMENTS

JP 09254079 A * 9/1997

OTHER PUBLICATIONS machine translation of JP 09254079 A.*

* cited by examiner

Primary Examiner — Kawing Chan
(74) Attorney, Agent, or Firm — Staas & Halsey LLP

(57) ABSTRACT

Disclosed are a robot arm having high back-drivability to interact with a human being, which is safely stopped, and a method of controlling the robot arm. When the operation of the robot arm having high back-drivability to interact with a human being is converted into a safety mode due to the occurrence of an emergency, in which the operation of the robot arm is stopped, only a torque having a degree to compensate for gravity applied to the robot arm, i.e., only a torque to maintain the kinematical position of the current state of the robot arm without falling of the robot arm due to gravity, is outputted to control the robot arm as if the robot arm is in a weightless state, thus being capable of safely stopping the robot arm.

17 Claims, 5 Drawing Sheets

ROBOT ARM AND METHOD OF CONTROLLING THE SAME

CROSS-REFERENCE TO RELATED APPLICATIONS

This application claims the priority benefit of Korean Patent Application No. 2008-0123182, filed on Dec. 5, 2008, in the Korean Intellectual Property Office, the disclosure of which is incorporated herein by reference.

BACKGROUND

1. Field

Embodiments relate to a robot arm and a method of controlling the same, and more particularly to a robot arm having high back-drivability to interact with a human being, which is safely stopped, and a method of controlling the robot arm.

2. Description of the Related Art

In general, machines, which conduct motions similar to those of a human being using an electrical or magnetic action, refer to robots. Initial robots were industrial robots, such as manipulators or transfer robots, for work automation and unmanned operation in a production field, which perform dangerous work, simple repetitive work, or work requiring large force in place of a human being. Recently, humanoid robots, which have a joint system similar to that of a human being, live together with the human being in human working and living spaces, and provide various services, have been vigorously researched and developed.

Such a humanoid robot includes robot arms having high back-drivability to interact with a human being in daily life, and each of the robot arms is formed in a single rod shape or has a plurality of joints. The back-drivability denotes a degree of the movement of the robot arm, when external force is applied to the robot arm under the condition that current is not applied to a joint motor (generally, an actuator) and thus no torque is generated.

Therefore, under the condition that power is cut off, the robot arm having high back-drivability is easily moved using external force, a torque applied to a joint of the robot arm is easily measured through motor current due to small kinematical friction of the joint, and the stiffness of the robot arm is adjusted through an impedance control such that the robot arm achieves flexibility and thus is capable of performing an interaction with a human being (for example, a hug with the human being).

However, in case that power supplied to the robot arm having high back-drivability is cut off in an emergency, in which the operation of the robot arm is stopped, the robot arm (particularly, the tip of the robot arm) is dropped down by gravity due to the small friction of the joint. Thus, in case that power supplied to the robot arm is cut off, when the robot arm is located at a low position, no trouble is caused, but when the robot arm is located at a high position, the robot arm is excessively moved.

SUMMARY

An aspect of exemplary embodiments provide a robot arm having high back-drivability to interact with a human being, which is safely stopped through a gravity compensation control in case that the operation of the robot arm is converted into a safety mode due to the occurrence of an emergency, in which the operation of the robot arm is stopped, and a method of controlling the robot arm.

In accordance with an aspect of exemplary embodiments, there is provided a method of controlling a robot arm, which performs an operation by the driving of motors respectively provided in joints, including determining whether or not the robot arm is in a safety mode, in which the operation of the robot arm is stopped; calculating a compensation torque of gravity applied to the robot arm, when it is determined that the robot arm is in the safety mode; and performing a gravity compensation control of the robot arm according to the calculated compensation torque of gravity.

The determination of whether or not the robot arm is in the safety mode may include measuring currents outputted from the motors during the operation of the robot arm, and comparing the measured currents with a control reference value; and determining whether or not the robot arm is in the safety mode, in which the operation of the robot arm is stopped, by checking degrees of torques generated from the joints according to a result of the comparison.

The determination of whether or not the robot arm is in the safety mode may include sensing speeds of the joints during the operation of the robot arm, and comparing the sensed speeds with a control reference value; and determining whether or not the robot arm is in the safety mode, in which the operation of the robot arm is stopped, according to a result of the comparison.

The compensation torque of gravity may be calculated using a center of gravity of the robot arm, a weight of the robot arm, and angles of the joints.

In an aspect of exemplary embodiments, as the angles of the joints become smaller, the value of the compensation torque of gravity becomes larger.

When the joints are perpendicular to a horizontal plane, the compensation torque of gravity may be close to zero.

The compensation torque of gravity may be a torque to maintain the current position of the robot arm such that the robot arm cannot fall due to gravity.

The gravity compensation control may be performed such that the compensation torque of gravity is outputted to the motors to maintain the current position of the robot arm.

The method may further include determining whether or not a user moves to a safe position through the gravity compensation control of the robot arm; and terminating the operation of the robot arm, when the user moves to the safe position.

In accordance with an aspect of exemplary embodiments, there is provided a robot arm including joints; motors to respectively drive the joints; and a control unit to determine whether or not the robot arm is in a safety mode, in which the operation of the robot arm is stopped, while the operation of the robot arm is performed by the driving of the motors, calculate a compensation torque of gravity applied to the joints, when it is determined that the robot arm is in the safety mode, and perform a gravity compensation control according to the calculated compensation torque of gravity.

The joints may be at least one joint.

The robot arm may have high back-drivability such that the robot arm can be moved by external force due to the small friction of the at least one joint.

The robot arm may further include a sensing unit to measure currents of the motors during the operation of the robot arm, and the control unit may compare the measured currents with a control reference value, and determine whether or not the robot arm is in the safety mode, in which the operation of the robot arm is stopped, by checking degrees of torques generated from the joints according to a result of the comparison.

The robot arm may further include a sensing unit to sense speeds of the joints during the operation of the robot arm, and the control unit may compare the sensed speeds with a control reference value, and determine whether or not the robot arm is in the safety mode, in which the operation of the robot arm is stopped, according to a result of the comparison.

The control unit may calculate the compensation torque of gravity using a center of gravity of the robot arm, a weight of the robot arm, and angles of the joints.

When the angles of the joints are small, the control unit may output a large value of the compensation torque of gravity to the motors to maintain the current position of the robot arm such that the robot arm cannot fall due to gravity.

When the joints are perpendicular to a horizontal plane, the control unit may output a value of the compensation torque of gravity being close to zero to the motors to maintain the current position of the robot arm such that the robot arm cannot fall due to gravity.

BRIEF DESCRIPTION OF THE DRAWINGS

These and/or other aspects of exemplary embodiments will become apparent and more readily appreciated from the following description of exemplary embodiments, taken in conjunction with the accompanying drawings in which.

DETAILED DESCRIPTION

Figure 1:
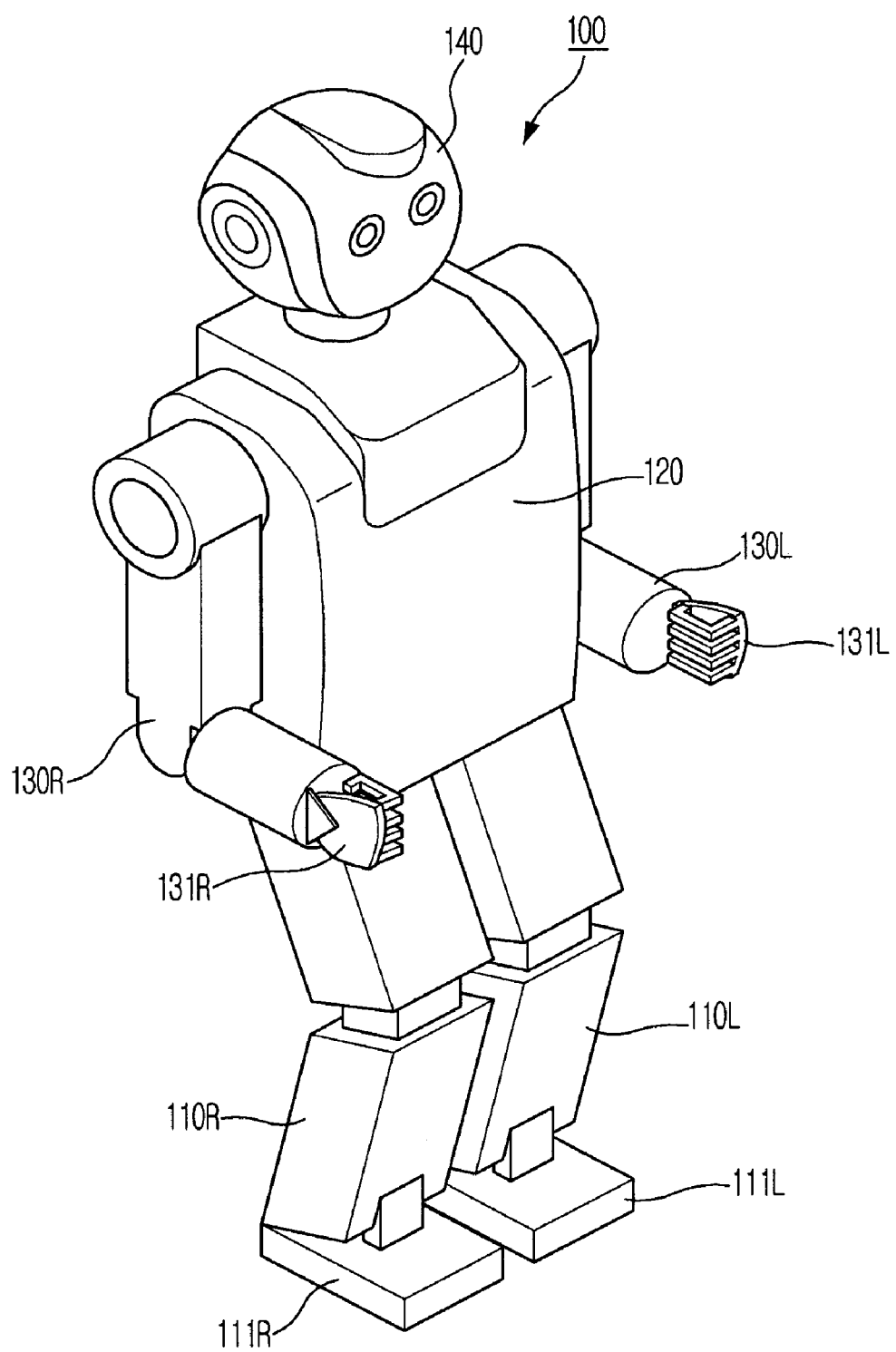
FIG. 1 is a perspective view illustrating the schematic configuration of a robot in accordance with an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a perspective view illustrating the schematic configuration of a robot in accordance with an exemplary embodiment.

In FIG. 1, a robot 100 in accordance with an exemplary embodiment is a biped walking robot, which walks upright with two legs 110R and 110L in the same way as a human being, and includes a torso 120, two arms 130R and 130L and a head 140 provided at the upper portion of the torso 120, and feet 111R and 111L and hands 131R and 131L respectively provided at tips of the two legs 110R and 110L and the two arms 130R and 130L.

Here, R represents the right side of the robot 100, and L represents the left side of the robot 100.

Figure 2:
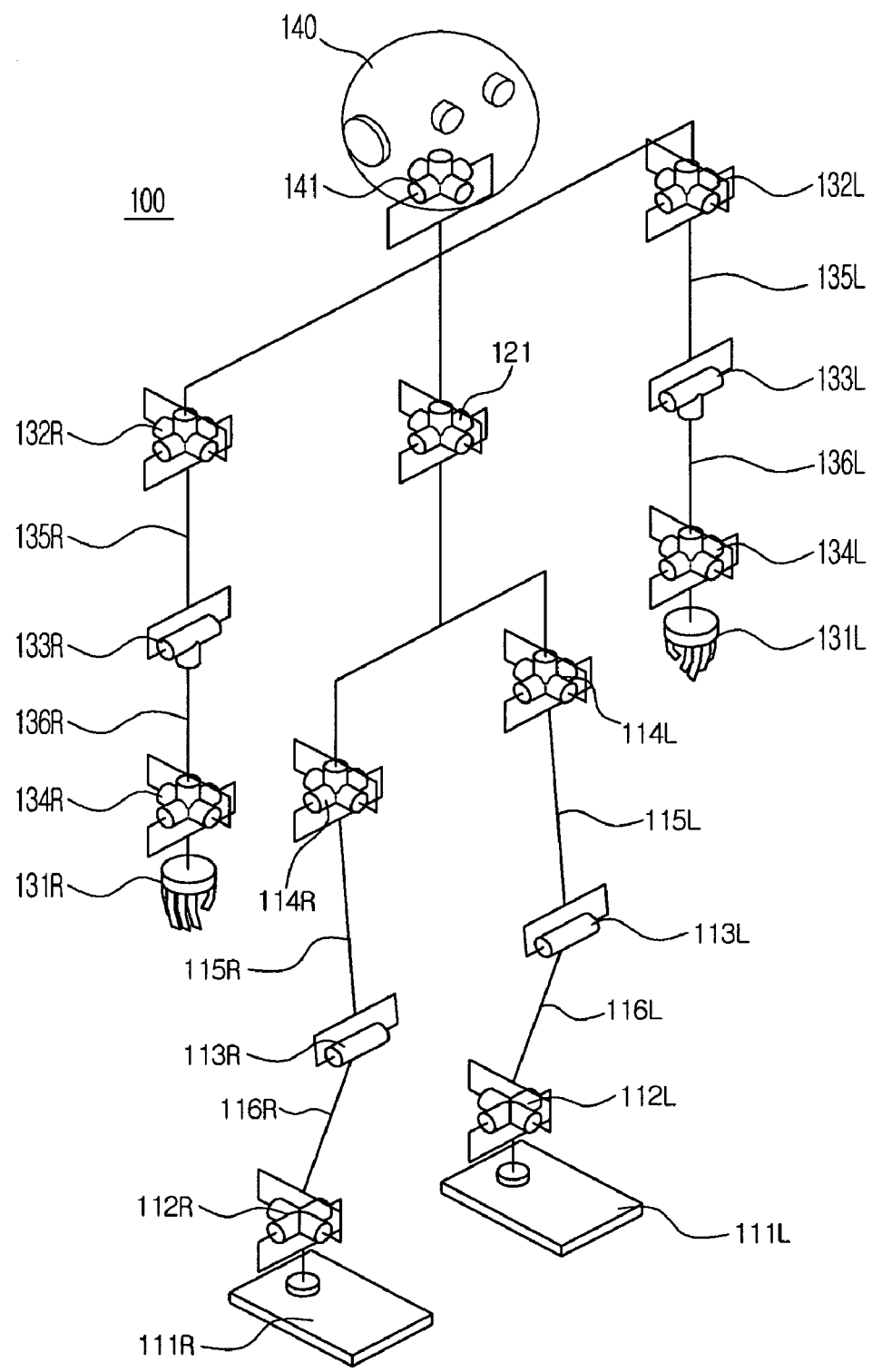
FIG. 2 is a view illustrating structures of main joints of the robot of FIG. 1.

FIG. 2 is a view illustrating structures of main joints of the robot 100 of FIG. 1.

In FIG. 2, the two legs 110R and 110L respectively include ankle joints 112R and 112L, knee joints 113R and 113L, and hip joints 114R and 114L such that parts of the robot 100 corresponding to ankles, knees, and hips are rotatable, and the hip joints 114R and 114L are located at both sides of the lower portion of the torso 120 connected with the two legs 110R and 110L.

The ankle joints 112R and 112L of the respective legs 110R and 110L are movable in the directions of the X-axis (roll axis) and the Y-axis (pitch axis), the knee joints 113R and 113L of the respective legs 110R and 110L are movable in the direction of the Y-axis (pitch axis), and the hip joints 114R and 114L of the respective legs 110R and 110L are movable in the directions of the X-axis (roll axis), the Y-axis (pitch axis), and the Z-axis (yaw axis).

Further, the two legs 110R and 110L respectively include thigh links 115R and 115L connecting the hip joints 114R and 114L and the knee joints 113R and 113L, and calf links 116R and 116L connecting the knee joints 113R and 113L and the ankle joints 112R and 112L, and thus have a designated degree of freedom according to the movements of the respective joints 112R, 112L, 113R, 113L, 114R, and 114L.

The two arms 130R and 130L respectively include shoulder joints 132R and 132L, elbow joints 133R and 133L, and wrist joints 134R and 134L such that parts of the robot 100 corresponding to shoulders, elbows, and wrists are rotatable, and the shoulder joints 132R and 132L are located at both sides of the upper portion of the torso 120.

The shoulder joints 132R and 132L of the respective arms 130R and 130L are movable in the directions of the X-axis (roll axis), the Y-axis (pitch axis), and Z-axis (yaw axis), the elbow joints 133R and 133L of the respective arms 130R and 130L are movable in the direction of the Y-axis (pitch axis), and the wrist joints 134R and 134L of the respective arms 130R and 130L are movable in the directions of the X-axis (roll axis), the Y-axis (pitch axis), and the Z-axis (yaw axis).

Further, the two arms 130R and 130L respectively include upper arm links 135R and 135L connecting the shoulder joints 132R and 132L and the elbow joints 133R and 133L, and lower arm links 136R and 136L connecting the elbow joints 133R and 133L and the wrist joints 134R and 134L, and thus have a designated degree of freedom according to the movements of the respective joints 132R, 132L, 133R, 133L, 134R, and 134L. The robot arms 130R and 130L with the above kinematical structure has high back-drivability due to the small friction of the joints 132R, 132L, 133R, 133L, 134R, and 134L.

The torso 120 connected with the two legs 110R and 110L includes a waist joint 121 such that a part of the robot 100 corresponding to a waist is rotatable, and the head 140 connected to the torso 120 includes a neck joint 141 such that a part of the robot 100 corresponding to a neck is rotatable.

Figure 3:
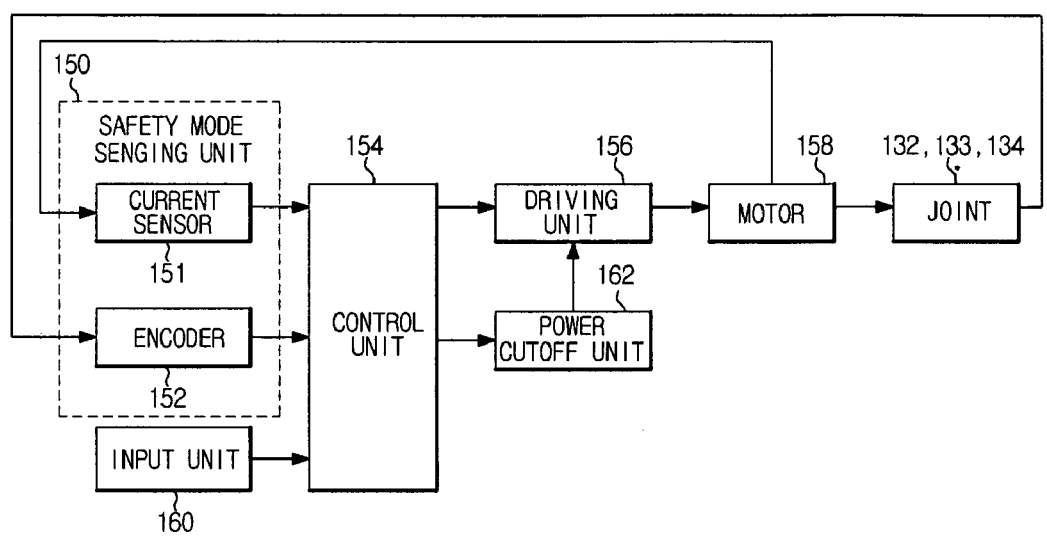
FIG. 3 is a control block diagram to safely stop the robot arm having high back-drivability in accordance with an exemplary embodiment.

Each of the joints 112R, 112L, 113R, 113L, 114R, 114L, 132R, 132L, 133R, 133L, 134R, 134L, 121, and 141 includes a motor 158 (for example, an electric motor, such as an actuator), as shown in FIG. 3, to drive the corresponding joint.

FIG. 3 is a control block diagram to safely stop the robot arm having high back-drivability in accordance with an exemplary embodiment. The robot arm includes a safety mode sensing unit 150, a control unit 154, a driving unit 156, an input unit 160, and a power cutoff unit 162.

The safety mode sensing unit 150 senses whether or not an emergency, in which the operation of the robot arm 130R or 130L having high back-drivability to interact with a human being is stopped, occurs during the interaction of the robot arm 130R or 130L with the human being (for example, a hug with the human being). The safety mode sensing unit 150 includes a current sensor 151 to sense currents flowing in the motors 158 provided in the respective joints 132R or 132L, 133R or 133L, and 134R or 134L of the robot arm 130R or 130L, and an encoder 152 to sense speeds of the respective joints 132R or 132L, 133R or 133L, and 134R or 134L of the robot arm 130R or 130L.

The control unit 154 checks whether or not any excessive torque is generated by comparing the currents sensed by the current sensor 151 of the safety mode sensing unit 150 with a predetermined control reference value, or checks whether or not any abnormal speed is generated by comparing the speeds sensed by the encoder 152 of the safety mode sensing unit 150 with a predetermined control reference value, and thus determines whether or not an emergency, in which the operation of the robot arm 130R or 130L is stopped, occurs. Then, in case that the emergency occurs and the operation of the robot arm 130R or 130L needs to be converted into the safety mode, the control unit 154 safely stops the robot arm 130R or 130L through a gravity compensation control.

Further, the control unit 154 monitors whether or not a user safely escapes from the robot arm 130R or 130L through the gravity compensation control of the robot arm 130R or 130L, and terminates the operation of the robot arm 130R or 130L, in case that the user moves to a safe position.

The driving unit 156, in case that the operation of the robot arm 130R or 130L is converted into the safety mode, drives the motors 158 provided in the respective joints 132R or 132L, 133R or 133L, and 134R or 134L of the robot arm 130R or 130L such that torques of the respective joints 132R or 132L, 133R or 133L, and 134R or 134L of the robot arm 130R or 130L are controlled according to a torque control signal outputted from the control unit 154.

The input unit 160 allows the user to directly input instructions to safely terminate the operation of the robot arm 130R or 130L and transmit the instructions to the control unit 154, after the user moves to the safe position through the gravity compensation control of the robot arm 130R or 130L.

Although an exemplary embodiment has described that the user directly inputs the instructions to safely terminate the operation of the robot arm 130R or 130L, whether or not the user moves to the safe position (for example, the initial position) through the gravity compensation control may be monitored through various sensors (a three-dimensional measuring unit, an FIT sensor, etc.) installed on the robot 100, and a result of monitoring may be transmitted to the control unit 154.

The power cutoff unit 162 receives a power control signal of the control unit 154 according to user's instructions, and cuts off power supplied to the robot arm 130R or 130L or converts the operation of the robot arm 130R or 130L into a standby mode, after the user moves to the safe position through the gravity compensation control of the robot arm 130R or 130L.

Hereinafter, an operation of the above-described robot arm and effects of a method of controlling the robot arm will be described.

In the robot arm 130R or 130L having high back-drivability in accordance with an exemplary embodiment, torques applied to the joints 132R or 132L, 133R or 133L, and 134R or 134L are easily measured through currents of the motors 158 due to small kinematical friction of the joints 132R or 132L, 133R or 133L, and 134R or 134L, and the stiffness of the robot arm 130R or 130L is adjusted through an impedance control such that the robot arm 130R or 130L achieves flexibility and thus is capable of performing an interaction with a human being (for example, a hug with the human being).

However, the robot arm 130R or 130L having high back-drivability fall down by the effect of gravity, when power supplied to the robot arm 130R or 130L is cut off due to the occurrence of an emergency, in which the operation of the robot arm 130R or 130L is stopped. In an exemplary embodiment, a user can easily move the robot arm 130R or 130L through a gravity compensation control, before the power supplied to the robot arm 130R or 130L is cut off due to the occurrence of the emergency, and thus safely escape from the robot arm 130R or 130L or move the robot arm 130R or 130L to a position, which does not collide with surroundings. This operation of the robot arm 130R or 130L will be described with reference to FIG. 5.

Figure 5:
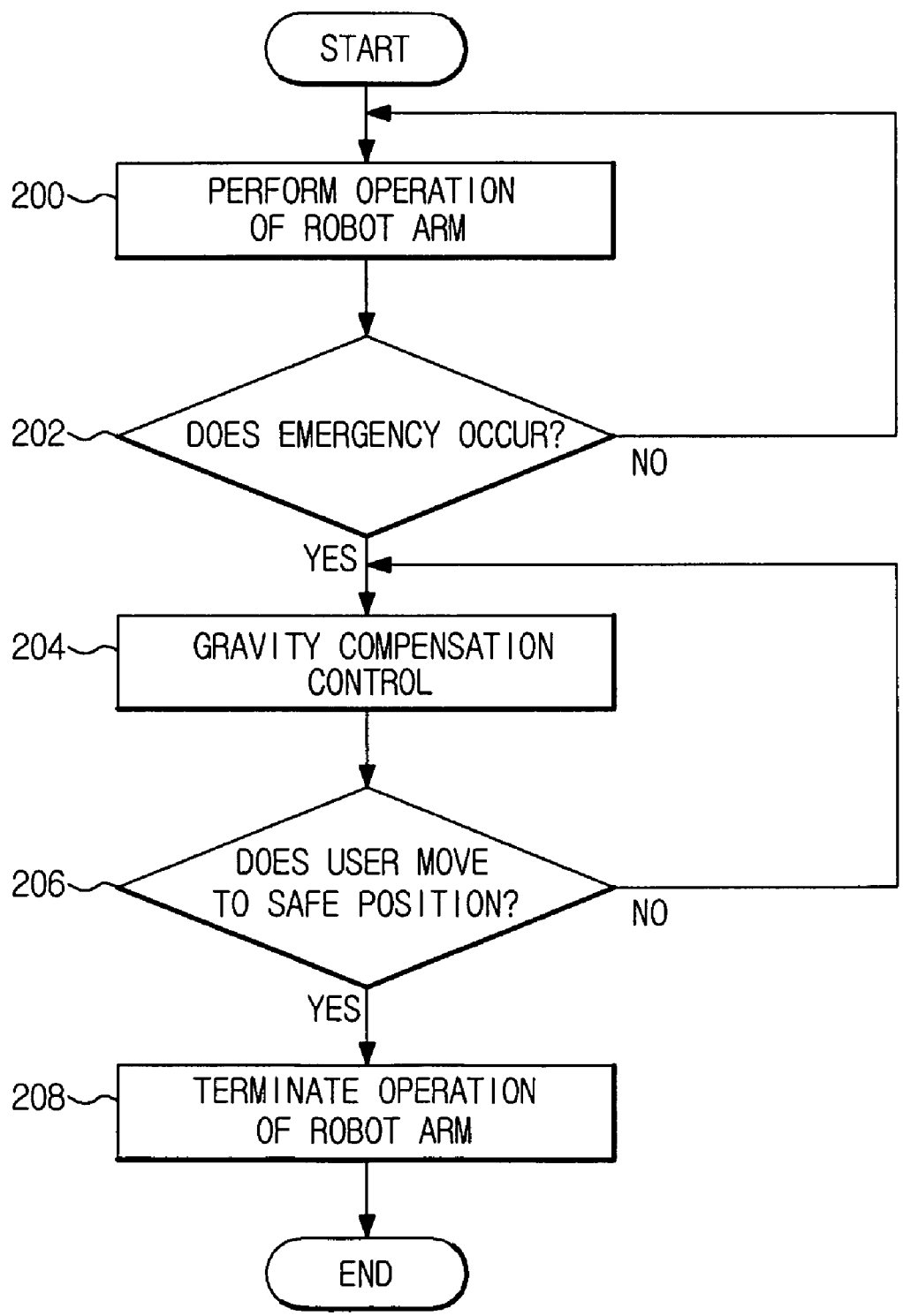
FIG. 5 is a flow chart illustrating a method of safely stopping the robot arm having high back-drivability in accordance with an exemplary embodiment.

FIG. 5 is a flow chart illustrating a method of safely stopping the robot arm having high back-drivability in accordance with an exemplary embodiment.

In FIG. 5, the control unit 154 of the robot arm 130R or 130L having high back-drivability calculates torques required to perform an interaction with a human being (for example, a hug with the human being) and outputs the calculated torques to the motors 158 of the joints 132R or 132L, 133R or 133L, and 134R or 134L, and then the operation of the robot arm 130R or 130L is performed (operation 200). During this operation, a gravity compensation control value is calculated or is not used, if necessary.

Thereafter, the control unit 154 determines whether or not an emergency, in which the operation of the robot arm 130R or 130L is stopped, occurs during the operation of the robot arm 130R or 130L having high back-drivability (operation 202).

The determination of whether or not an emergency occurs is achieved by measuring currents flowing in the motors 158 of the respective joints 132R or 132L, 133R or 133L, and 134R or 134L of the robot arm 130R or 130L through the current sensor 151 of the safety mode sensing unit 150 or sensing speeds of the respective joints 132R or 132L, 133R or 133L, and 134R or 134L of the robot arm 130R or 130L through the encoder 152 of the safety mode sensing unit 150.

Therefore, the control unit 154 checks whether or not any excessive torque is generated by comparing the currents sensed by the current sensor 151 with a predetermined control reference value, or checks whether or not any abnormal speed is generated by comparing the speeds sensed by the encoder 152 with a predetermined control reference value, and thus determines whether or not an emergency, in which the operation of robot arm 130R or 130L is stopped, occurs.

Although an exemplary embodiment has described that whether or not an emergency, in which the operation of robot arm 130R or 130L is stopped, occurs is determined by checking torques and speeds through the current sensor 151 or the encoder 152, whether or not an emergency occurs may be determined using acceleration values according to the speeds of the respective joints 132R or 132L, 133R or 133L, and 134R or 134L of the robot arm 130R or 130L sensed by the encoder 152, or it may be determined that an emergency occurs in case of a sudden happening caused by various reasons, such as the falling down of the robot 100, etc.

As a result of the determination of the operation 202, when it is determined that an emergency occurs, the control unit 154 performs a gravity compensation control so as to suspend the operation conducted by the robot arm 130R or 130L and safely stop the robot arm 130R or 130L (operation 204).

The gravity compensation control denotes a control method, in which only a torque having a degree to compensate for gravity applied to the robot arm 130R or 130L, i.e., to maintain the kinematical position of the current state of the robot arm 130R or 130L without falling of the robot arm 130R or 130L due to gravity, is outputted to control the robot arm 130R or 130L as if the robot arm 130R or 130L is in a weightless state. When the gravity compensation control is performed, a user can easily move the robot arm 130R or 130L although the user is close to the robot arm 130R or 130L or caught in the robot arm 130R or 130L and thus safely escape from the robot arm 130R or 130L, and it is possible to prevent the falling of the robot arm 130R or 130L due to gravity and thus to prevent the collision of the robot arm 130R or 130L with surroundings, thereby protecting devices of the robot arm 130R or 130L or peripheral environment around the robot arm 130R or 130L and securing user's safety.

Hereinafter, a method of calculating a torque to perform the gravity compensation control will be described with reference to FIG. 4.

Figure 4:
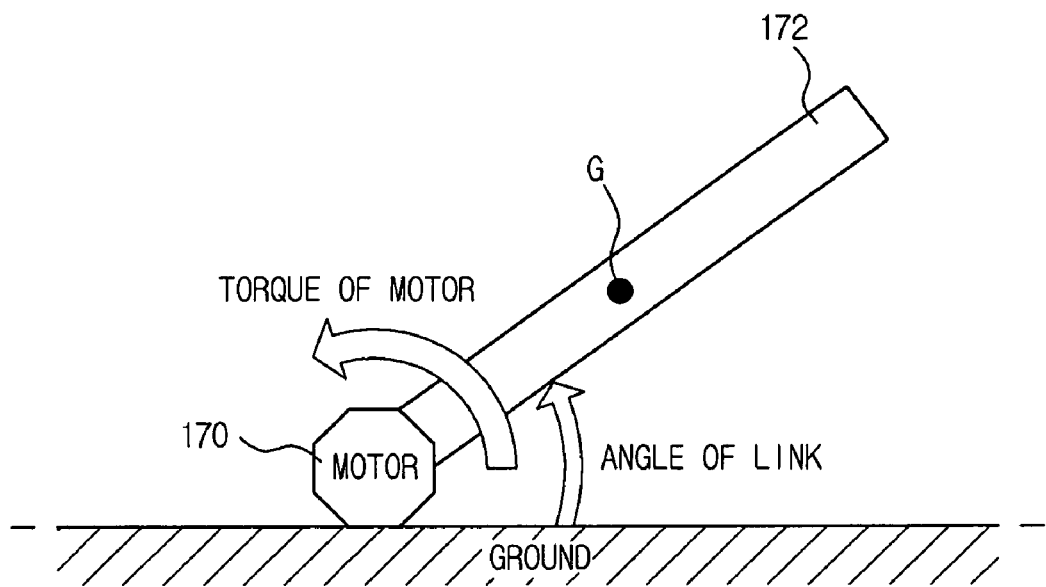
FIG. 4 is a view illustrating a method of calculating a torque to perform a gravity compensation control in accordance with an exemplary embodiment.

FIG. 4 is a view illustrating the method of calculating a torque to perform the gravity compensation control in accordance with an exemplary embodiment.

As shown in FIG. 4, a motor 170 is installed on the ground, and a link 172 is connected to a driving shaft of the motor 170. The link 172 has a mass, and thus a weight having a size obtained by multiplying the mass by the acceleration of gravity caused by gravity is applied to the link 172 in the direction of gravity.

The gravity compensation control is performed such the motor 170 generates a minimum torque so as not to move the link 172 when external force is not applied to the link 172 in the above state. The torque is calculated using the center of gravity (G) representing the weight of the link 172, the weight of the link 172, and an angle of the link 172, which is formed by the link 172 and the ground. The smaller the angle of the link 172, the larger torque the motor 170 generates so as not to move the link 172. When the angle of the link 172 is 90°, i.e., the link 172 is perpendicular to the ground, the torque is close to zero.

In case that the link 172 is moved by external force, as described above, the torque is calculated by the changed angle of the link 172. The torque is expressed by a function of the angle of the link 172, i.e., an angle (θ) of a joint, as the following expression [1].

$$\tau = g(\theta) \quad \text{Expression [1]}$$

Here, τ represents a torque of the motor 170, and g represents a mapping of a gravity compensation function according to the angle (θ) of the joint.

Thereafter, the control unit 154 monitors whether or not a user moves to a safe position through the gravity compensation control of the robot arm 130R or 130L (operation 206). The monitoring whether or not the user moves to the safe position may be achieved by causing the user to directly input instructions to safely terminate the operation of the robot arm 130R or 130L through the input unit 160, after the user moves to the safe position, or be achieved through various sensors (a three-dimensional measuring unit, an F/T sensor, etc.) installed on the robot 100.

When it is determined that the user moves to the safe position, the control unit 154 transmits a power control signal to the power cutoff unit 162, and the power cutoff unit 162 cuts off power supplied to the robot arm 130R or 130L or converts the operation of the robot arm 130R or 130L into a standby mode according to the power control signal of the control unit 154. Thereby, the operation of the robot arm 130R or 130L is terminated (operation 208).

In accordance with an exemplary embodiment, when the operation of the robot arm having high back-drivability to interact with a human being is converted into a safety mode due to the occurrence of an emergency, in which the operation of the robot arm is stopped, only a torque having a degree to compensate for gravity applied to the robot arm, i.e., only a torque to maintain the kinematical position of the current state of the robot arm without falling of the robot arm due to gravity, is outputted to control the robot arm as if the robot arm is in a weightless state, thus being capable of safely stopping the robot arm. Thereby, a user can easily move the robot arm and thus safely escape from the robot arm, and it is possible to prevent the falling of the robot arm due to gravity and thus to protect devices of the robot arm and peripheral environment around the robot arm.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A method of controlling a robot arm, which performs an operation by the driving of motors respectively provided in joints, comprising:
   determining whether or not the robot arm is in a safety mode, in which the operation of the robot arm is stopped;
   calculating a compensation torque of gravity applied to the robot arm, when it is determined that the robot arm is in the safety mode;
   performing a gravity compensation control of the robot arm according to the calculated compensation torque of gravity;
   determining whether or not a user moves to a safe position while the gravity compensation control of the robot arm is performed; and
   terminating the operation of the robot arm, when the user moves to the safe position position,
   wherein the user directly inputs instructions by use of an input unit to safely terminate the operation of the robot arm after the user moves to the safe position while the gravity compensation control of the robot arm is being performed.

2. The method according to claim 1, wherein the determination of whether or not the robot arm is in the safety mode includes:
   measuring currents outputted from the motors during the operation of the robot arm, and comparing the measured currents with a control reference value; and
   determining whether or not the robot arm is in the safety mode, in which the operation of the robot arm is stopped, by checking degrees of torques generated from the joints according to a result of the comparison.

3. The method according to claim 1, wherein the determination of whether or not the robot arm is in the safety mode includes:
   sensing speeds of the joints during the operation of the robot arm, and comparing the sensed speeds with a control reference value; and
   determining whether or not the robot arm is in the safety mode, in which the operation of the robot arm is stopped, according to a result of the comparison.

4. The method according to claim 1, wherein the compensation torque of gravity is calculated using a center of gravity of the robot arm, a weight of the robot arm, and angles of the joints.

5. The method according to claim 4, wherein as the angles of the joints with respect to a horizontal line become smaller, the value of the compensation torque of gravity becomes larger.

6. The method according to claim 4, wherein when the joints are perpendicular to a horizontal plane, the compensation torque of gravity is close to zero.

7. The method according to claim 1, wherein the compensation torque of gravity is a torque to maintain the current position of the robot arm such that the robot arm cannot fall due to gravity.

8. The method according to claim 7, wherein the gravity compensation control is performed such that the compensation torque of gravity is outputted to the motors to maintain the current position of the robot arm.

9. The method according to claim 1, wherein the user directly inputs instructions to safely terminate the operation of the robot arm after the user moves to the safe position while the gravity compensation control of the robot arm is performed.

10. A robot arm comprising:
joints;
motors to respectively drive the joints; and
a control unit to determine whether or not the robot arm is in a safety mode, in which the operation of the robot arm is stopped, while the operation of the robot arm is performed by the driving of the motors, the control unit to calculate a compensation torque of gravity applied to the joints, when it is determined that the robot arm is in the safety mode, the control unit to perform a gravity compensation control according to the calculated compensation torque of gravity, and the control unit to determine whether or not a user moves to a safe position while the gravity compensation control of the robot arm is performed,
wherein the operation of the robot arm is terminated, when the user moves to the safe position, and
wherein the user directly inputs instructions by use of an input unit to safely terminate the operation of the robot arm and transmits the instructions to the control unit after the user moves to the safe position while the gravity compensation control of the robot arm is being performed.

11. The robot arm according to claim 10, wherein the robot arm has high back-drivability such that the robot arm can be moved by external force due to the small friction of the at least one of the joints.

12. The robot arm according to claim 10, further comprising:
a sensing unit to measure currents of the motors during the operation of the robot arm,
wherein the control unit compares the measured currents with a control reference value, and determines whether or not the robot arm is in the safety mode, in which the operation of the robot arm is stopped, by checking degrees of torques generated from the joints according to a result of the comparison.

13. The robot arm according to claim 10, further comprising:
a sensing unit to sense speeds of the joints during the operation of the robot arm,
wherein the control unit compares the sensed speeds with a control reference value, and determines whether or not the robot arm is in the safety mode, in which the operation of the robot arm is stopped, according to a result of the comparison.

14. The robot arm according to claim 10, wherein the control unit calculates the compensation torque of gravity using a center of gravity of the robot arm, a weight of the robot arm, and angles of the joints.

15. The robot arm according to 14, wherein when the angles of the joints are small, the control unit outputs a large value of the compensation torque of gravity to the motors to maintain the current position of the robot arm such that the robot arm cannot fall due to gravity.

16. The robot arm according to claim 14, wherein when the joints are perpendicular to a horizontal plane, the control unit outputs a value of the compensation torque of gravity being close to zero to the motors to maintain the current position of the robot arm such that the robot arm cannot fall due to gravity.

17. The robot arm according to claim 10, wherein the user directly inputs instructions to safely terminate the operation of the robot arm and transmits the instructions to the control unit after the user moves to the safe position while the gravity compensation control of the robot arm is performed.

* * * * *

UNITED STATES PATENT AND TRADEMARK OFFICE
CERTIFICATE OF CORRECTION

PATENT NO. : 8,405,340 B2
APPLICATION NO. : 12/588691
DATED : March 26, 2013
INVENTOR(S) : Kyung Won Moon et al.

It is certified that error appears in the above-identified patent and that said Letters Patent is hereby corrected as shown below:

In the Claims:

Column 8, Line 32, In Claim 1, after "safe" delete "position".
Column 10, Line 24, In Claim 15, after "to" insert -- claim --.

Signed and Sealed this
Twenty-sixth Day of November, 2013

Margaret A. Focarino
*Commissioner for Patents of the United States Patent and Trademark Office*